W. H. HUMPHREYS.
PNEUMATIC SPRING.
APPLICATION FILED JULY 5, 1907.

912,376.

Patented Feb. 16, 1909.

Witnesses
Henry Williams
Thomas

Inventor
Wm. Hy. Humphreys
per Chas

Attorney

UNITED STATES PATENT OFFICE.

WILLIAM HENRY HUMPHREYS, OF LIVERPOOL, ENGLAND.

PNEUMATIC SPRING.

No. 912,376.  Specification of Letters Patent.  Patented Feb. 16, 1909.

Application filed July 5, 1907. Serial No. 382,373.

*To all whom it may concern:*

Be it known that I, WILLIAM HENRY HUMPHREYS, a subject of the King of Great Britain and Ireland, residing at 4 Thornes road, Kensington, Liverpool, England, have invented a new and useful Improvement in Pneumatic Springs, of which the following is a specification.

Figure 1:
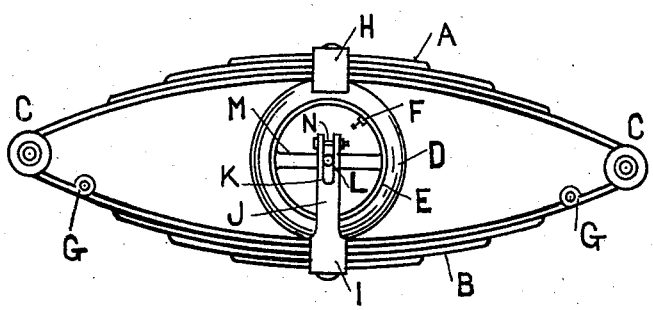
Figure 2:
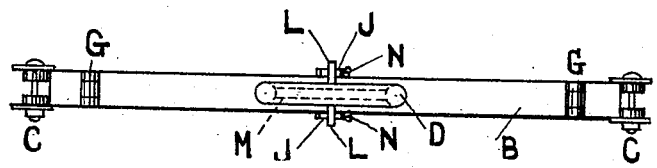

This invention relates to springs more especially of the kind known as elliptical or bow springs and has for its object to combine therewith one or more approximately circular hollow members adapted to be pumped up with compressed air in such manner that while sufficient strength and resilient action is insured in the elliptical spring, this is reinforced and shared and distributed by means of said inflated members all as hereinafter particularly described and claimed. I term the inflated member a pneumatic buffer. And in order that my invention may be carried into effect, I append a sheet of drawings illustrating my invention as applied to a semi-elliptical laminated spring the method of attachment of which to a vehicle will be readily understood by anyone skilled in the art to which my invention appertains, and in which, Figure 1 is a side elevation, and Fig. 2 is a plan of Fig. 1, the top portion of the spring hereinafter described being removed for the sake of clearness.

A shows the top portion of the spring and B shows the bottom portion and C shows the joining portions at each end which also form jaws for coupling up in well known manner. I place a pneumatic buffer D which is much like a small pneumatic tire and the rim whereof is marked E and the valve whereof is marked F and this buffer D when inflated helps to deaden shocks and to absorb vibration by reason of the air pressure between the top part A and the bottom part B, which pressure is also distributed throughout the interior of said buffer. In order to render the action more easy, that is to say to let the air tube D take up the shocks rather than the spring itself I provide joints G which render the whole structure more elastic.

H shows a clipping plate to prevent the buffer from moving sidewise at top it being understood that this is continued across the top of the top spring A and dips down on the other side thereof in similar manner so that it will be seen that the top part of the buffer cannot shift out of place. I is a similar plate affixed to the bottom laminated portion B and J shows a pair of arms which rise from the plate I and these have slots K (see Fig. 1) in which the spindle L rides, this spindle being affixed to a cross piece M fastened to the rim E.

N are bolts which serve to prevent the buffer from coming quite adrift in case of deflation or bursting of the tube D.

It will thus be seen that when the air tubes D are inflated the greater part of the weight of the superstructure is carried by the buffer thus giving great resiliency but should the tube become deflated the springs come into operation.

Although I describe laminated members it should be understood that plain bow springs may be used instead.

I wish to point out that the pneumatic buffer is placed centrally within the laminated portions and that the pressure between them is thus applied at diametrically opposite points and this construction gives (under momentary shocks such for instance as are caused by the vehicle running over a stone) the best distribution of pressure waves within said buffer and a gradual and beneficial absorbing effect and reaction.

What I do claim as my invention and desire to secure by Letters Patent, is:—

In a spring two laminated member pivotally connected together at their ends and having an inflated buffer between them and the lower member whereof has an additional pivotal joint near each end, whereby bodily movement of the middle portion without distortion is rendered possible, substantially as described.

In witness whereof I have hereunto set my hand in presence of two witnesses.

WILLIAM HENRY HUMPHREYS.

Witnesses:
HENRY WILLIAMS,
CHARLES COVENTRY.